(12) United States Patent
Dong et al.

(10) Patent No.: US 12,103,862 B1
(45) Date of Patent: Oct. 1, 2024

(54) MODIFIED LITHIUM ION NEGATIVE ELECTRODE MATERIAL, AND PREPARATION THEREFOR AND USE THEREOF

(71) Applicant: JIANGSU ZENERGY BATTERY TECHNOLOGIES GROUP CO., LTD., Suzhou (CN)

(72) Inventors: Zhentao Dong, Suzhou (CN); Sidong Zhuang, Suzhou (CN); Zongbiao Xia, Suzhou (CN); Bei Lu, Suzhou (CN); Haoming Yang, Suzhou (CN); Zhenyuan Zhang, Suzhou (CN); Changming Xu, Suzhou (CN)

(73) Assignee: JIANGSU ZENERGY BATTERY TECHNOLOGIES GROUP CO., LTD., Jiangsu (CN)

( * ) Notice: Subject to any disclaimer, the term of this patent is extended or adjusted under 35 U.S.C. 154(b) by 0 days.

(21) Appl. No.: 18/624,900

(22) Filed: Apr. 2, 2024

(30) Foreign Application Priority Data

Apr. 20, 2023 (CN) .......................... 202310425360.5

(51) Int. Cl.
   *C01G 49/00* (2006.01)
   *H01M 4/485* (2010.01)
   *H01M 4/02* (2006.01)

(52) U.S. Cl.
   CPC .......... *C01G 49/009* (2013.01); *H01M 4/485* (2013.01); *C01P 2006/12* (2013.01); *C01P 2006/40* (2013.01); *H01M 2004/027* (2013.01)

(58) Field of Classification Search
   CPC .............................. H01M 4/485; C01G 49/009
   (Continued)

(56) References Cited

U.S. PATENT DOCUMENTS

2003/0073001 A1* 4/2003 Barker ................ C01G 25/006
423/598

FOREIGN PATENT DOCUMENTS

CN        101877407 A       4/2009
CN        104813508 A       5/2012
(Continued)

OTHER PUBLICATIONS

Chen et al. Reversible Li+ Storage in a LiMnTiO4 Spinel and Its Structural Transition Mechanisms. J. Phys. Chem. C 2014, 118, 24, 12608-12616 [online]. Retrieved from <URL: https://pubs.acs.org/doi/full/10.1021/jp501618n> (Year: 2014).*
(Continued)

*Primary Examiner* — James M Erwin
(74) *Attorney, Agent, or Firm* — THE SUN IP LAW

(57) ABSTRACT

The present disclosure relates to the technical field of batteries, and in particular, to a modified lithium ion negative electrode material, and preparation therefor and use thereof. The preparation method includes the following steps: dropwise adding a mixed solution of a titanium source and a lithium source into a mixed solution of an iron salt and an organic acid, adjusting the pH to 5.0-7.0, and stirring to obtain a wet gel; drying and crushing the wet gel, and then calcinating to obtain a LiFeTiO$_4$ composite oxide; and reducing the LiFeTiO$_4$ composite oxide to obtain the modified lithium ion negative electrode material. In the present disclosure, a spinel modified negative electrode material lithium iron titanium oxide is synthesized by using a citric acid sol-gel method, thereby not only greatly improving the charging and discharging capacity thereof, but also improving the large-current charging and discharging capability thereof.

8 Claims, 2 Drawing Sheets

(58) Field of Classification Search
USPC .................................................. 429/231.95
See application file for complete search history.

(56) References Cited

FOREIGN PATENT DOCUMENTS

| | | | |
|---|---|---|---|
| CN | 109119622 A | 9/2018 | |
| CN | 115425207 A | 9/2022 | |
| EP | 2784853 A1 * | 10/2014 | ............. B82Y 30/00 |

OTHER PUBLICATIONS

Zhang et al. Li4Ti5O12 prepared by a modified citric acid sol-gel method for lithium-ion battery. Journal of Power Sources, vol. 236, 2013, pp. 118-125 [online]. Retrieved from <URL: https://www.sciencedirect.com/science/article/pii/S0378775313001924> (Year: 2013).*

The first search report of priority Chinese application No. 202310425360.5 issued on Apr. 20, 2023.

Minghe, Luo, Synthesis and electrochemical characteristics of isostructural LiMTiO4 (M=Mn, Fe,Co), Ceramics International, Jan. 24, 2017.

* cited by examiner

MODIFIED LITHIUM ION NEGATIVE ELECTRODE MATERIAL, AND PREPARATION THEREFOR AND USE THEREOF

TECHNICAL FIELD

The present disclosure relates to the technical field of batteries, and in particular, to a modified lithium ion negative electrode material, and preparation therefor and use thereof.

BACKGROUND OF THE INVENTION

With the development of science and technology, a negative electrode carbon material for a lithium battery has certain improvements in terms of safety and cycle performance, but still has some defects: during initial charge and discharge, a passivation film is formed on the surface of carbon to cause capacity loss; the potential of a carbon electrode is close to the potential of lithium, and when the battery is overcharged, metallic lithium can still precipitate on the surface of the carbon electrode to form dendrite lithium, thereby causing a short circuit, and causing a safety problem; there is a significant voltage lag; and the preparation process is complex, and high-temperature runaway may occur.

A spinel-type lithium titanium oxide $Li_4Ti_5O_{12}$ negative electrode material has a theoretical capacity of 175 mAh·$g^{-1}$ and a relatively high electrode voltage, the raw materials thereof have wide sources, are clean and environmentally friendly and easy to prepare, and the crystal structure thereof can maintain a high degree of stability during intercalation and deintercalation of lithium ions. Accordingly, the lithium titanium oxide has excellent cycle performance and stable discharge voltage, and has the good name of "zero strain". However, the lithium titanium oxide compound has a low specific capacity, poor electrical conductivity, and high discharge voltage when used as a negative electrode material of a lithium ion battery, and an output voltage of the battery is low; furthermore, in a high-temperature synthesis process, the growth of particles is not easy to control, and the tap density is low, resulting in a low volume specific capacity and energy density. The lithium titanium oxide compound itself is an insulator, and has low electronic conductivity and ionic conductivity, resulting in an initial irreversible capacity loss and poor high-rate charging and discharging performance.

Therefore, doping modification needs to be performed on the spinel-type lithium titanium oxide, so as to reduce the lithium intercalation potential thereof and increase the electrical conductivity, thereby improving the large-current charging and discharging performance.

SUMMARY OF THE INVENTION

The present disclosure aims to solve the described problem, and provide a modified lithium ion negative electrode material, and preparation therefor and use thereof. A spinel modified negative electrode material lithium iron titanium oxide is synthesized by using a citric acid sol-gel method, so that doping modification of a spinel-type lithium titanium oxide is achieved, thereby not only greatly improving the charging and discharging capacity thereof, but also improving the large-current charging and discharging capability thereof.

According to the technical solutions in the present disclosure, the preparation method for the modified lithium ion negative electrode material includes the following steps:

S1: adding an organic acid to an iron salt solution to obtain a solution I;
at the same time, dissolving a titanium source and a lithium source in an alcohol solvent to obtain a solution II;

S2: dropwise adding the solution II into the solution I, adjusting the pH to 5.0-7.0, and continuing stirring to obtain a wet gel;

S3: drying and crushing the wet gel, and then calcinating to obtain a $LiFeTiO_4$ composite oxide; and S4: under the action of a reducing gas, performing a heat treatment on the $LiFeTiO_4$ composite oxide to obtain the modified lithium ion negative electrode material, wherein the chemical formula of the modified lithium ion negative electrode material is $LiFeTiO_x$, where $1<x<4$.

In the present disclosure, the titanium source, the lithium source and the iron salt are used as raw materials, the organic acid is a complexing agent, the alcohol is a solvent, and nano-scale $LiFeTiO_4$ is synthesized, the average particle size thereof is 80-120 nm, which is obviously smaller than that in a solid-phase reaction; oxygen vacancies generated by reduction improve the intrinsic conductivity of the material; since the organic acid is used as a complexing agent, residual conductive carbon will be formed on the oxide surface during calcination; and doping of carbon elements not only reduces the contact resistance, but also plays a role of dispersion. The modified lithium iron titanium oxide ameliorates the defects of low specific capacity and poor conductivity, and improves the electrochemical performance of a lithium titanium oxide negative electrode material.

Further, the molar ratio of the iron salt in the solution I to the lithium source in the solution II is (0.1-0.3):1; for example, the molar ratio may be 0.1:1, 0.2:1 or 0.3:1, and preferably, the molar ratio is 0.2:1. By controlling the amount of the iron salt, the doping amount of Fe atoms can be precisely controlled. Doping of Fe elements can improve the lattice structure of original materials, and can improve the electronic structure of the materials, thereby facilitating improvement of the conductivity and specific capacity of the original materials.

Further, in step S1, the addition amount of the organic acid is 1-5 times of the mole number of metal ions, and the metal ions are lithium ions, iron ions and titanium ions. Preferably, the addition amount of the organic acid is 1-2 times of the mole number of the metal ions.

Further, the molar ratio of the titanium source and the lithium source is (0.8-1):1.

Further, a solvent of the iron salt solution is water, the iron salt is a soluble iron salt, and is selected from one or more of ferric nitrate, ferric chloride and ferric sulfate, for example, $Fe(NO_3)_3 \cdot 9H_2O$ may be used;

the organic acid is selected from one or more of citric acid, malic acid and tartaric acid;

the titanium source is selected from one or more of tetrabutyl titanate, n-butyl titanate and isopropyl titanate;

the lithium source is selected from one or more of lithium acetate, lithium carbonate, lithium oxalate and lithium nitrate;

and the alcohol solvent is selected from one or more of ethanol, methanol, ethylene glycol and diethylene glycol.

Further, in step S1, an organic acid (such as citric acid) is added to an iron salt solution, and ultrasonic dispersion is performed to obtain a solution I, wherein the ultrasonic dispersion time is 0.5-1 h; and a titanium source and a lithium source at a molar ratio of (0.8-1):1 are added to an alcohol solvent (such as absolute ethyl alcohol) and stirred for 0.5-2 h, to obtain a clear and transparent solution II.

Further, in step S2, the solution II is dropwise added into the solution I under a stirring condition, wherein specifically, the stirring can use mechanical stirring, and the rotational speed is 400-800 r/min.

Further, in step S2, the pH value of the mixed solution is adjusted to 5.0-7.0 by adding ammonia water.

Further, in step S2, the stirring is continued for 3-6 h under a condition of 30-50° C., so as to obtain a wet gel. By stirring at a constant temperature, it is convenient to form a wet gel with a uniform form.

Specifically, the operation of step S2 may be as follows: dropwise adding the solution II into the solution I under a stirring state at a speed of 400-800 r/min, adjusting the pH to 5.0-7.0 by adding ammonia water, and continuing stirring for 3-6 h at 30-50° C. to obtain a wet gel.

Further, F in step S3, the drying temperature is 60-90° C. and the drying time is 24-72 h, and drying is performed to form a xerogel; after the drying is completed, the xerogel is ground and crushed to obtain a powder xerogel.

Further, in step S3, the calcination is carried out twice, in which the temperature for the first calcination is 260-350° C., and the time is 1-5 h; and the temperature for the second calcination is 550-750° C., and the time is 1.5-4 h.

Further, between the first calcination and the second calcination, an operation of grinding after cooling is further included.

Specifically, specific operations of the calcination are as follows: first, increasing the temperature to 260-350° C. at a heating rate of 1-3° C./min, and maintaining the temperature for 1-5 h for first calcination, so as to remove the organic acid; and cooling and then grinding, and then increasing the temperature to 550-750° C. at a heating rate of 4-6° C./min, and maintaining the temperature for 1.5-4 h for second calcination.

Further, in step S4, the reducing gas is hydrogen, and the flow rate of the hydrogen is 5-7 mL/min. Specifically, a mixed gas of hydrogen and an inert gas can be introduced, wherein the inert gas serves as a protective gas for a firing material. In some embodiments, the mixed gas uses 10% of $H_2$—Ar and the flow rate thereof is 50-70 mL/min, preferably 60 mL/min.

Further, in step S4, when the temperature for the heat treatment is 350-650° C., the time is 2-8 h, preferably heating at 400° C. for 6 h, and the heating rate is 4-6° C./min.

Specifically, in step S4, a $LiFeTiO_4$ composite oxide (solid powder) obtained by the second calcination is tiled on the bottom of a container (such as a porcelain boat), then the container is placed in a heating device (such as a central constant temperature zone of a quartz tube of a tube furnace), evacuated by using a vacuum pump in a sealed state, then 10% of $H_2$—Ar is slowly introduced until a pressure value reaches a normal pressure, the gas flow rate is maintained at 50-70 mL/min, the temperature is gradually increased to 350-650° C. at a heating rate of 4-6° C./min, maintained for 2-8 h, and then cooled to room temperature, so as to obtain the $LiFeTiO_x$ composite oxide.

A second aspect of the present disclosure provides a modified lithium ion negative electrode material prepared by using the preparation method above.

Specifically, the modified lithium ion negative electrode material can increase the capacity by 78 mA·h/g, and can discharge 70% of the capacity during 10 C discharge.

A third aspect of the present disclosure provides a negative electrode sheet, including a negative electrode active material layer, wherein the negative electrode active material layer contains the described modified lithium ion negative electrode material.

Specifically, the negative electrode sheet includes a negative electrode current collector and a negative electrode active material layer covering the negative electrode current collector; a preparation method therefor may be as follows: preparing a negative electrode slurry from a modified lithium ion negative electrode material, a binder and a conductive agent at a certain ratio, then coating same on a negative electrode current collector, and performing drying and tabletting, to obtain the negative electrode sheet. The negative electrode material, the binder and the conductive agent are at a conventional ratio in the art; and the binder and the conductive agent are selected from binders and conductive agents commonly used in the art.

A fourth aspect of the present disclosure provides a battery, including the negative electrode sheet above.

Specifically, the battery includes a positive electrode sheet, a negative electrode sheet, a separator and an electrolyte; wherein the negative electrode sheet uses the described negative electrode sheet, and the separator is used to separate the positive electrode sheet from the negative electrode sheet.

Compared with the related art, the technical solutions of the present disclosure have the following advantages:

1. The negative electrode material in the present disclosure can accurately control the doping amount of Fe atoms and form a nanoscale oxide by cooperation of raw materials and preparation conditions in a preparation process.

2. For the negative electrode material in the present disclosure, since gas phase reduction will convert some $Ti^{4+}$ into $Ti^{3+}$, lattice distortion will occur around the material to generate a large amount of oxygen vacancies, so that the conductivity of crystals increases, and also a certain dispersion effect is also achieved.

3. For the negative electrode material in the present disclosure, as the organic acid serves as a complexing agent, conductive carbon may remain on the surface of an oxide during calcination, thereby reducing the contact resistance of the material and improving the specific capacity.

DETAILED DESCRIPTION OF THE INVENTION

Figure 1:
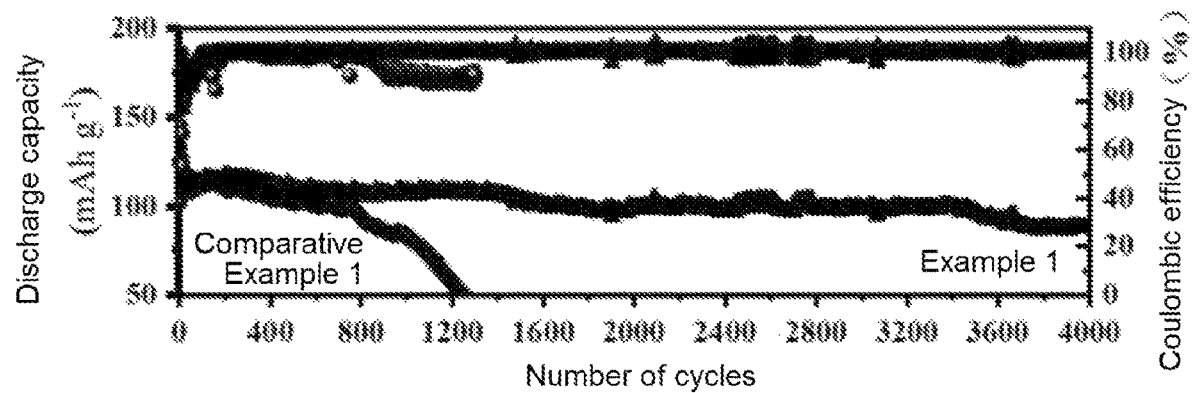
FIG. 1 is a result diagram of cycle tests of batteries prepared by using the materials obtained in Example 1 and Comparative Example 1.

Hereinafter, the present disclosure will be further described with reference to the accompanying drawings and specific embodiments, so that a person skilled in the art could better understand the present disclosure and implement same, but the embodiments listed are not intended to limit the present disclosure.

The present disclosure provides a preparation method for a modified lithium ion negative electrode material, including the following steps:

S1: adding an organic acid to an iron salt solution, and performing ultrasonic dispersion for 0.5-1 h to obtain a solution I;

at the same time, dissolving a titanium source and a lithium source in an alcohol solvent, stirring same for 0.5-2 h, to obtain a clear and transparent solution II;

wherein the molar ratio of the iron salt to the lithium source is (0.1-0.3):1, and the addition amount of citric acid is 1-2 times of the mole number of metal ions;

S2: slowly dropwise adding the solution II into the solution I under a stirring state at a rotational speed of 400-800 r/min, after the dropwise addition is completed, adding ammonia water to adjust the pH to 5.0-7.0, continuing stirring, and stirring at a constant temperature of 30-50° C. for 3-6 h to form a wet gel;

S3: drying the wet gel at 60-90° C. for 24-72 h to form a xerogel, and then grinding same to form a powder; heating the powder from room temperature (25±5° C.) to 260-350° C. at a heating rate of 1-2° C./min and maintaining the temperature for 1-5 h to remove the citric acid; after the temperature is reduced to room temperature, taking same out, grinding and then performing second calcination, increasing the temperature from room temperature to 550-750° C. and maintaining the temperature for 1.5-4 h, and the heating rate being 4-6° C./min, so as to obtain a LiFeTiO$_4$ composite oxide; and S4: introducing a mixed gas of hydrogen and an inert gas, the gas flow rate being 50-70 mL/min, increasing the temperature of the LiFeTiO$_4$ composite oxide to 350-650° C. at a heating rate of 4-6° C./min, maintaining the temperature for 2-8 h, and then cooling to room temperature, so as to obtain a modified lithium ion negative electrode material, i.e. a LiFeTiO$_x$ composite oxide.

Example 1 Synthesis of modified lithium ion negative electrode material lithium titanium oxide by a sol-gel method 0.1 mol of Fe(NO$_3$)$_3$·9H$_2$O was taken to formulate a 100 mL aqueous solution, an ultrasonic treatment was performed to achieve uniform mixing, then 4.5 mol of C$_6$H$_8$O$_7$·H$_2$O (citric acid monohydrate) was added and the ultrasonic treatment continued for 0.5 h to obtain a solution I;

and in another container, 1.6 mol of tetrabutyl titanate and 1.3 mol of lithium acetate were taken and mixed with 550 mL of absolute ethyl alcohol, and then were stirred continuously for a time period of 0.5 h to obtain a clear and transparent solution II.

The solution II was dropwise added into the solution I, mechanical stirring was performed rapidly at 400 r/min; after the dropwise addition was completed, the pH value of the mixed solution was adjusted to 6.0 by using ammonia water, and the mixed solution was stirred at a constant temperature of 40° C. for 6 h to form a wet gel; and the wet gel was dried at a condition of 80° C. for 48 h to form a xerogel, and then the xerogel was ground into a powder, and in a muffle furnace, the temperature was increased from room temperature to 300° C. and maintained for 2 h, wherein the heating rate was 2° C./min. After the temperature was reduced to room temperature, the xerogel was taken out, ground again and then subjected to second calcination, the temperature was increased from room temperature to 600° C. and maintained for 2 h, the heating rate being 5° C./min, so as to obtain a LiFeTiO$_4$ composite oxide.

A solid powder of the LiFeTiO$_4$ composite oxide was placed into a tube furnace, 10% of H$_2$—Ar was introduced, a gas flow rate was maintained at 60 mL/min, the temperature was increased from room temperature to 400° C. at a heating rate of 5° C./min, the maintaining time being 6 h, so as to obtain a LiFeTiO$_x$ composite oxide negative electrode material (Fe content being 2.8%), wherein 1<x<4. Since gas phase reduction would convert some Ti$^{4+}$ into Ti$^{3+}$, lattice distortion would occur around the material to generate a large amount of oxygen vacancies. However, it couldn't be determined how much Ti$^{4+}$ was converted into Ti$^{3+}$, only that x ranged from 1 to 4.

Example 2 Synthesis of modified lithium ion negative electrode material lithium titanium oxide by a sol-gel method 0.16 mol of Fe(NO$_3$)$_3$·9H$_2$O was taken to formulate a 100 mL aqueous solution, an ultrasonic treatment was performed to achieve uniform mixing, then 4.5 mol of C$_6$H$_8$O$_7$·H$_2$O (citric acid monohydrate) was added and the ultrasonic treatment continued for 0.5 h to obtain a solution 1;

and in another container, 1.56 mol of tetrabutyl titanate and 1.28 mol of lithium acetate were taken and mixed with 550 mL of absolute ethyl alcohol, and then were stirred continuously for a time period of 0.5 h to obtain a clear and transparent solution II.

The solution II was dropwise added into the solution I, mechanical stirring was performed rapidly at 400 r/min; after the dropwise addition was completed, the pH value of the mixed solution was adjusted to 6.0 by using ammonia water, and the mixed solution was stirred at a constant temperature of 40° C. for 6 h to form a wet gel; and the wet gel was dried at a condition of 80° C. for 48 h to form a xerogel, and then the xerogel was ground into a powder, and in a muffle furnace, the temperature was increased from room temperature to 300° ° C. and maintained for 2 h, wherein the heating rate was 2° C./min. After the temperature was reduced to room temperature, the xerogel was taken out, ground again and then subjected to second calcination, the temperature was increased from room temperature to 600° C. and maintained for 2 h, the heating rate being 5° C./min, so as to obtain a LiFeTiO$_4$ composite oxide.

A solid powder of the LiFeTiO$_4$ composite oxide was placed into a tube furnace, 10% of H$_2$—Ar was introduced, a gas flow rate was maintained at 60 mL/min, the temperature was increased from room temperature to 400° C. at a heating rate of 5° C./min, the maintaining time being 6 h, so as to obtain a LiFeTiO$_x$ composite oxide negative electrode material (Fe content being 4.05%).

Example 3 Synthesis of modified lithium ion negative electrode material lithium titanium oxide by a sol-gel method 0.1 mol of Fe(NO$_3$)$_3$·9H$_2$O was taken to formulate a 100 mL aqueous solution, an ultrasonic treatment was performed to achieve uniform mixing, then 6 mol of C$_6$H$_8$O$_7$·H$_2$O (citric acid monohydrate) was added and the ultrasonic treatment continued for 0.5 h to obtain a solution 1;

and in another container, 1.6 mol of tetrabutyl titanate and 1.3 mol of lithium acetate were taken and mixed with 550 mL of absolute ethyl alcohol, and then were stirred continuously for a time period of 0.5 h to obtain a clear and transparent solution II.

The solution II was dropwise added into the solution I, mechanical stirring was performed rapidly at 400 r/min; after the dropwise addition was completed, the pH value of the mixed solution was adjusted to 6.0 by using ammonia water, and the mixed solution was stirred at a constant temperature of 40° C. for 6 h to form a wet gel; and the wet gel was dried at a condition of 80° C. for 48 h to form a xerogel, and then the xerogel was ground into a powder, and in a muffle furnace, the temperature was increased from room temperature to 300° C. and maintained for 2 h, wherein the heating rate was 2° C./min. After the temperature was reduced to room temperature, the xerogel was taken out, ground again and then subjected to second calcination, the temperature was increased from room temperature to 600° C. and maintained for 2 h, the heating rate being 5° C./min, so as to obtain a $LiFeTiO_4$ composite oxide.

A solid powder of the $LiFeTiO_4$ composite oxide was placed into a tube furnace, 10% of $H_2$—Ar was introduced, a gas flow rate was maintained at 60 mL/min, the temperature was increased from room temperature to 500° C. at a heating rate of 5° C./min, the maintaining time being 4 h, so as to obtain a $LiFeTiO_x$ composite oxide negative electrode material.

Example 4

The difference from Example 1 merely lies in that the mixed solution was stirred at a constant temperature of 30° C. for 6 h to form a wet gel.

Example 5

The difference from Example 1 merely lies in that the mixed solution was stirred at a constant temperature of 50° C. for 3 h to form a wet gel.

Example 6

The difference from Example 1 merely lies in that the xerogel was ground into a powder, and in a muffle furnace, the temperature was increased from room temperature to 260° C. and maintained for 5 h, wherein the heating rate was 2° C./min. After the temperature was reduced to room temperature, the xerogel was taken out, ground again and then subjected to second calcination, the temperature was increased from room temperature to 550° C. and maintained for 4 h, the heating rate being 5° C./min, so as to obtain a $LiFeTiO_4$ composite oxide.

Example 7

The difference from Example 1 merely lies in that the xerogel was ground into a powder, and in a muffle furnace, the temperature was increased from room temperature to 350° C. and maintained for 1 h, wherein the heating rate was 2° C./min. After the temperature was reduced to room temperature, the xerogel was taken out, ground again and then subjected to second calcination, the temperature was increased from room temperature to 750° C. and maintained for 1.5 h, the heating rate being 5° C./min, so as to obtain a $LiFeTiO_4$ composite oxide.

Example 8

The difference from Example 1 merely lies in that a solid powder of the $LiFeTiO_4$ composite oxide was placed into a tube furnace, 10% of $H_2$—Ar was introduced, a gas flow rate was maintained at 60 mL/min, the temperature was increased from room temperature to 350° C. at a heating rate of 5° C./min, the maintaining time being 8 h, so as to obtain a $LiFeTiO_x$ composite oxide negative electrode material.

Example 9

The difference from Example 1 merely lies in that a solid powder of the $LiFeTiO_4$ composite oxide was placed into a tube furnace, 10% of $H_2$—Ar was introduced, a gas flow rate was maintained at 60 mL/min, the temperature was increased from room temperature to 650° C. at a heating rate of 5° C./min, the maintaining time being 2 h, so as to obtain a $LiFeTiO_x$ composite oxide negative electrode material.

Example 10

The difference from Example 1 merely lies in that 0.1 mol of $Fe(NO_3)_3 \cdot 9H_2O$ was taken to formulate a 100 mL aqueous solution, an ultrasonic treatment was performed to achieve uniform mixing, then 4.5 mol of $C_6H_8O_7 \cdot H_2O$ (citric acid monohydrate) was added and the ultrasonic treatment continued for 0.5 h to obtain a solution I; and in another container, 1.6 mol of tetrabutyl titanate and 1 mol of lithium acetate were taken and mixed with 550 mL of absolute ethyl alcohol, and then were stirred continuously for a time period of 0.5 h to obtain a clear and transparent solution II.

Example 11

The difference from Example 1 merely lies in that 0.3 mol of $Fe(NO_3)_3 \cdot 9H_2O$ was taken to formulate a 100 mL aqueous solution, an ultrasonic treatment was performed to achieve uniform mixing, then 4.5 mol of $C_6H_8O_7 \cdot H_2O$ (citric acid monohydrate) was added and the ultrasonic treatment continued for 0.5 h to obtain a solution I; and in another container, 1.6 mol of tetrabutyl titanate and 1 mol of lithium acetate were taken and mixed with 550 mL of absolute ethyl alcohol, and then were stirred continuously for a time period of 0.5 h to obtain a clear and transparent solution II.

Example 12

The difference from Example 1 merely lies in that 0.1 mol of $Fe(NO_3)_3 \cdot 9H_2O$ was taken to formulate a 100 mL aqueous solution, an ultrasonic treatment was performed to achieve uniform mixing, then 3 mol of $C_6H_8O_7 \cdot H_2O$ (citric acid monohydrate) was added and the ultrasonic treatment continued for 0.5 h to obtain a solution I; and in another container, 1.6 mol of tetrabutyl titanate and 1.3 mol of lithium acetate were taken and mixed with 550 mL of absolute ethyl alcohol, and then were stirred continuously for a time period of 0.5 h to obtain a clear and transparent solution II.

Example 13

The difference from Example 1 merely lies in that 0.1 mol of $Fe(NO_3)_3 \cdot 9H_2O$ was taken to formulate a 100 mL aqueous solution, an ultrasonic treatment was performed to achieve uniform mixing, then 15 mol of $C_6H_8O_7 \cdot H_2O$ (citric acid monohydrate) was added and the ultrasonic treatment continued for 0.5 h to obtain a solution I; and in another container, 1.6 mol of tetrabutyl titanate and 1.3 mol of lithium acetate were taken and mixed with 550 mL of absolute ethyl alcohol, and then were stirred continuously for a time period of 0.5 h to obtain a clear and transparent solution II.

The test results of the negative electrode materials prepared in Examples 4 to 13 were shown in Table 1.

TABLE 1

| | Negative electrode material | | | Battery |
|---|---|---|---|---|
| / | Granularity (D50) | Specific surface area ($m^2/g$) | Film resistance (m$\Omega$) | Number of cycles (90% discharging capacity) |
| Example 4 | 1.22 | 5.361 | 3.1 | 3875 |
| Example 5 | 1.23 | 5.339 | 3.2 | 3821 |
| Example 6 | 1.25 | 5.267 | 3.2 | 3799 |
| Example 7 | 1.24 | 5.098 | 3.2 | 3783 |
| Example 8 | 1.23 | 4.935 | 3.3 | 3527 |
| Example 9 | 1.25 | 4.866 | 3.3 | 3513 |
| Example 10 | 1.24 | 4.835 | 3.4 | 3493 |
| Example 11 | 1.25 | 4.798 | 3.4 | 3269 |
| Example 12 | 1.25 | 4.771 | 3.4 | 3248 |
| Example 13 | 1.23 | 4.725 | 3.5 | 3211 |

Comparative Example 1 Synthesis of modified lithium ion negative electrode material lithium titanium oxide by a sol-gel method 1.35 mol of $C_6H_8O_7 \cdot H_2O$ (citric acid monohydrate) was dissolved in 100 mL of deionized water, and an ultrasonic treatment was performed for 0.5 h, so as to obtain a solution I;

and in another container, 0.5 mol of tetrabutyl titanate and 0.4 mol of lithium acetate were taken and mixed with 150 mL of absolute ethyl alcohol, and then were stirred continuously for a time period of 0.5 h to obtain a clear and transparent solution II.

The solution II was dropwise added into the solution I, mechanical stirring was performed rapidly at 400 r/min; after the dropwise addition was completed, the pH value of the mixed solution was adjusted to 6.0 by using ammonia water, and the mixed solution was stirred at a constant temperature of 40° C. for 6 h to form a wet gel; and the wet gel was dried at a condition of 80° C. for 48 h to form a xerogel, and then the xerogel was ground into a powder, and in a muffle furnace, the temperature was increased from room temperature to 300° ° C. and maintained for 2 h, wherein the heating rate was 2° C./min. After the temperature was reduced to room temperature, the xerogel was taken out, ground again and then subjected to second calcination, the temperature was increased from room temperature to 600° C. and maintained for 2 h, the heating rate being 5° C./min, so as to obtain a $Li_4Ti_5O_{12}$ composite oxide.

A solid powder of the $Li_4Ti_5O_{12}$ composite oxide was placed into a tube furnace, 10% of $H_2$—Ar was introduced, a gas flow rate was maintained at 60 mL/min, the temperature was increased from room temperature to 400° C. at a heating rate of 5° C./min, the maintaining time being 6 h, so as to obtain a $Li_4Ti_5O_x$ composite oxide negative electrode material.

Comparative Example 2 Synthesis of modified lithium ion negative electrode material lithium titanium oxide by a sol-gel method 0.1 mol of $Fe(NO_3)_3 \cdot 9H_2O$ was taken to formulate a 100 mL aqueous solution, an ultrasonic treatment was performed to achieve uniform mixing, then 4.5 mol of $C_6H_8O_7 \cdot H_2O$ (citric acid monohydrate) was added and the ultrasonic treatment continued for 0.5 h to obtain a solution I;

and in another container, 1.6 mol of tetrabutyl titanate and 1.3 mol of lithium acetate were taken and mixed with 550 mL of absolute ethyl alcohol, and then were stirred continuously for a time period of 0.5 h to obtain a clear and transparent solution II.

The solution II was dropwise added into the solution I, mechanical stirring was performed rapidly at 400 r/min; after the dropwise addition was completed, the pH value of the mixed solution was adjusted to 6.0 by using ammonia water, and the mixed solution was stirred at a constant temperature of 40° C. for 6 h to form a wet gel; and the wet gel was dried at a condition of 80° C. for 48 h to form a xerogel, and then the xerogel was ground into a powder, and in a muffle furnace, the temperature was increased from room temperature to 300° C. and maintained for 2 h, wherein the heating rate was 2° C./min. After the temperature was reduced to room temperature, the xerogel was taken out, ground again and then subjected to second calcination, the temperature was increased from room temperature to 600° C. and maintained for 2 h, the heating rate being 5° C./min, so as to obtain a $LiFeTiO_4$ composite oxide.

Analysis of Results

1. The granularity, specific surface area and film resistance of the materials obtained in Example 1 and Comparative Example 1 were tested, in which the film resistance was tested by a TT-ACCF-G1R film resistance meter, and 10 tests were performed and an average value thereof was taken.

The results showed that:

In Example 1, the granularity was: D10 of 0.41, D50 of 1.22, D90 of 5.14 and D99 of 8.88; in Comparative Example 1, the granularity was: D10 of 0.43, D50 of 1.25, D90 of 5.07 and D99 of 8.92;

in Example 1, the specific surface area was 6.432 $m^2/g$, higher than 4.593 $m^2/g$ in Comparative Example 1; and in Example 1, the film resistance was 3.1 m$\Omega$, lower than 3.6 m$\Omega$ in Comparative Example 1.

2. The materials obtained in Example 1 and Comparative Examples 1-2 were used to prepare batteries and the batteries were tested.

A preparation method for a positive electrode sheet includes: a positive electrode, i.e. lithium iron phosphate, a conductive agent Super P and a binder PVDF were mixed at a mass ratio of 97:2:1, and then an NMP solvent was added for uniform mixing to prepare a positive electrode slurry; and the positive electrode slurry was uniformly coated, according to a certain areal density, onto the front and back surfaces of an aluminum foil coated with a conductive carbon layer, and air blow drying at 80-120° C., and then cold pressing, die-cutting were performed, to obtain a positive electrode sheet.

A preparation method for a negative electrode sheet includes: a negative electrode material obtained, conductive carbon black Super P and a negative electrode binder CMC at a mass ratio of 96:2:2 were uniformly mixed with deionized water to prepare a negative electrode slurry; the negative electrode slurry was uniformly coated on the front and back surfaces of a copper foil according to a certain areal density, and air blow drying at 80-120° C., and then cold pressing, die-cutting were performed to obtain a negative electrode sheet.

A preparation method for a battery includes: the positive electrode sheet, a PP separator and the negative electrode sheet were prepared into a jelly roll, wherein the PP separator needs to be able to completely wrap the positive electrode sheet and the negative electrode sheet. After the obtained jelly roll was placed in a metal housing or wrapped by an aluminum plastic film, an electrolyte solution was injected into the metal housing or aluminum plastic film. Finally, a lithium iron phosphate battery was prepared by processes such as still standing, formation and capacity division.

A test method for cycling of the battery cycle is: at 25±2° C., the battery was charged to 2.5 V under a 1 C constant current and a constant voltage, with a cut-off current being 0.05 C; and the battery stood still for 30 min, then was discharged to 1.0 V at 1 C, the process continued, and the number of cycles was recorded.

A test method for discharge rate is as follows: at 25±2° C., the battery was charged to 2.5 V under a 1 C constant current and a constant voltage, with a cut-off current being 0.05 C; and the battery stood still for 30 min, then was discharged to 1.0 V at 0.3 C, 0.5 C, 1 C, 2 C, 3 C, 5 C and 10 C, and different discharge currents were recorded for 10 cycles.

As shown in FIG. 1, it can be determined that the cycle performance of Example 1 is far superior to that of Comparative Example 1, and decreased by 8.9% at the 4000-th cycle. The initial capacity in Example 1 was 106.7 Ah, slightly higher than 104.5 Ah in Comparative Example 1.

Figure 2:
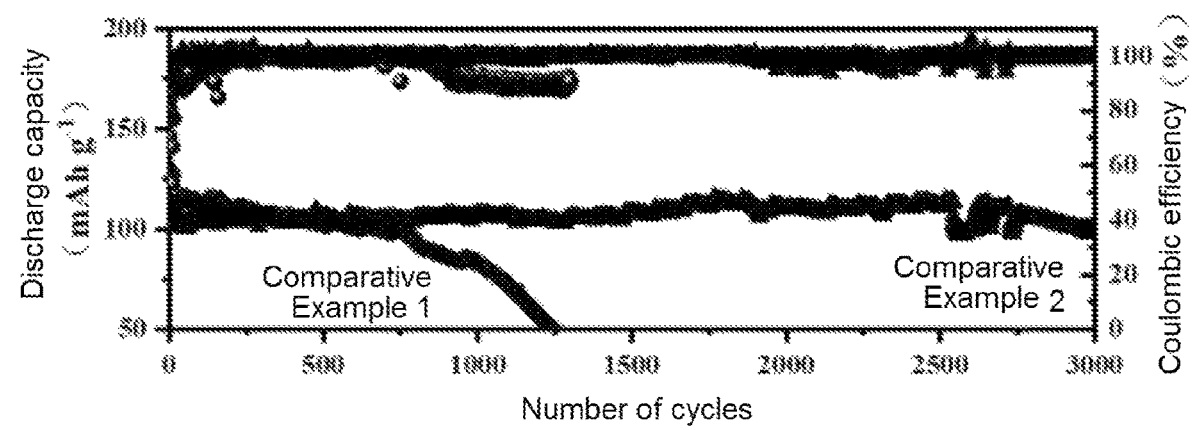
FIG. 2 is a result diagram of cycle tests of batteries prepared by using the materials obtained in Comparative Example 2 and Comparative Example 1.

As shown in FIG. 2, it can be determined that the battery of Comparative Example 2 began to rapidly attenuate at a cycle less than 2500-th cycle, and the cycle performance thereof was poorer than that in Example 1.

Figure 3:
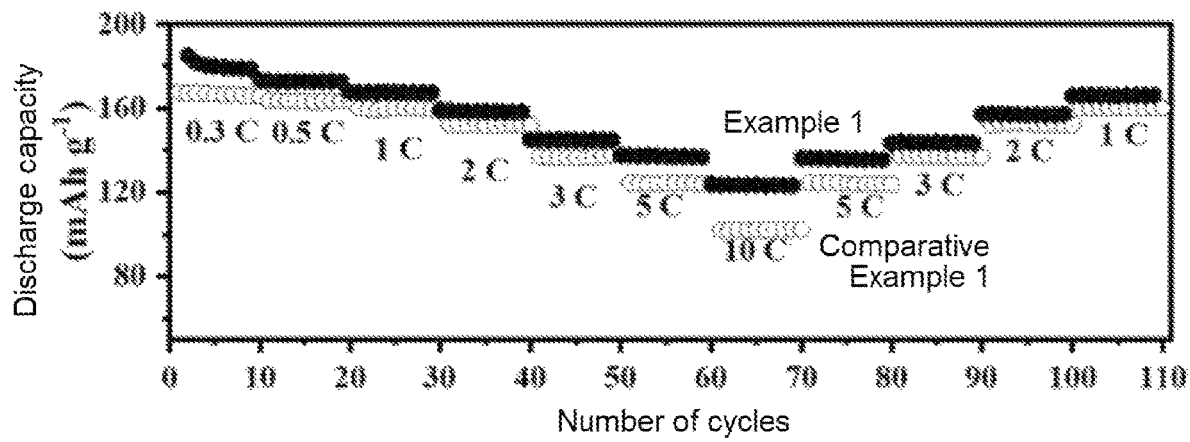
FIG. 3 is a result diagram of rate discharge tests of batteries prepared by using the materials obtained in Example 1 and Comparative Example 1.

As shown in FIG. 3, it can be determined that the large-current charging and discharging capability in Example 1 was high, and under a high current of 10 C, the discharging capacity thereof was maintained at about 70%, and the discharging capacity thereof was much higher than that of Comparative Example 1.

Figure 4:
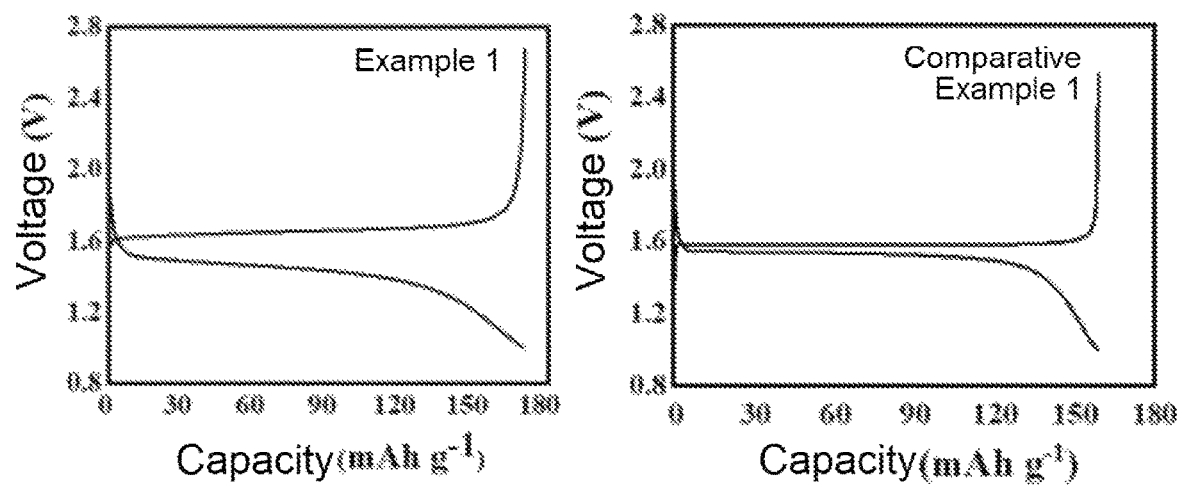
FIG. 4 is a result diagram of charge and discharge tests of batteries prepared by using the materials obtained in Example 1 and Comparative Example 1.

As shown in FIG. 4, it can be determined that the charging and discharging capacity of Example 1 was significantly higher than that of Comparative Example 1.

Apparently, the described embodiments are merely examples made for clear illustration, and are not intended to limit the embodiments. For a person of ordinary skill in the art, other variations or modifications of different forms may be made on the basis of the described illustration. Herein, it is neither necessary nor possible to list all embodiments in an exhaustive manner. Moreover, obvious variations or modifications derived therefrom are still within the scope of protection of the present invention and creation.

The invention claimed is:

1. A preparation method for a modified lithium ion negative electrode material, comprising the following steps,
    S1: adding an organic acid to an iron salt solution to obtain a solution I;
    at the same time, dissolving a titanium source and a lithium source in an alcohol solvent to obtain a solution II;
    S2: dropwise adding the solution II into the solution I, adjusting the pH to 5.0-7.0, and continuing stirring to obtain a wet gel;
    S3: drying the wet gel to form a xerogel, grinding and crushing the xerogel, and calcinating to obtain a LiFeTiO$_4$ composite oxide; and
    S4: under the action of a reducing gas, performing a heat treatment on the LiFeTiO$_4$ composite oxide to obtain the modified lithium ion negative electrode material, wherein the chemical formula of the modified lithium ion negative electrode material is LiFeTiO$_x$, where 1<x<4;
    in step S3, the calcination is carried out twice, in which the temperature for the first calcination is 260-350° C., and the time is 1-5 h; and the temperature for the second calcination is 550-750° C., and the time is 1.5-4 h;
    in step S4, the reducing gas is hydrogen, the temperature for the heat treatment is 350-650° C., and the time is 2-8 h.

2. The preparation method for a modified lithium ion negative electrode material according to claim 1, wherein the molar ratio of the iron salt in the solution I to the lithium source in the solution II is (0.1-0.3):1.

3. The preparation method for a modified lithium ion negative electrode material according to claim 1, wherein in step S1, the addition amount of the organic acid is 1-5 times of the mole number of metal ions, and the metal ions are lithium ions, iron ions and titanium ions.

4. The preparation method for a modified lithium ion negative electrode material according to claim 1, wherein
    the iron salt is selected from one or more of ferric nitrate, ferric chloride and ferric sulfate;
    the organic acid is selected from one or more of citric acid, malic acid and tartaric acid;
    the titanium source is selected from one or more of tetrabutyl titanate, n-butyl titanate and isopropyl titanate;
    the lithium source is selected from one or more of lithium acetate, lithium carbonate, lithium oxalate and lithium nitrate;
    and the alcohol solvent is selected from one or more of ethanol, methanol, ethylene glycol and diethylene glycol.

5. The preparation method for a modified lithium ion negative electrode material according to claim 1, wherein in step S2, the stirring is continued for 3-6 h under a condition of 30-50° C., so as to obtain a wet gel.

6. A modified lithium ion negative electrode material prepared by using the preparation method according to claim 1.

7. A negative electrode sheet, comprising a negative electrode active material layer, wherein the negative electrode active material layer comprises the modified lithium ion negative electrode material according to claim 6.

8. A battery, comprising the negative electrode sheet according to claim 7.

* * * * *